US006603394B2

(12) United States Patent
Raichle et al.

(10) Patent No.: US 6,603,394 B2
(45) Date of Patent: Aug. 5, 2003

(54) MULTI-PROTOCOL WIRELESS COMMUNICATION MODULE

(75) Inventors: Kurt R. Raichle, Owatonna, MN (US); David A. Reul, Owatonna, MN (US)

(73) Assignee: SPX Corporation, Charlotte, NC (US)

(*) Notice: Subject to any disclaimer, the term of this patent is extended or adjusted under 35 U.S.C. 154(b) by 0 days.

(21) Appl. No.: 09/731,661

(22) Filed: Dec. 8, 2000

(65) Prior Publication Data

US 2002/0070851 A1 Jun. 13, 2002

(51) Int. Cl.[7] .................. B60Q 1/00
(52) U.S. Cl. .................. 340/438; 701/29; 701/33
(58) Field of Search .................. 340/438, 439; 701/29, 32, 33

(56) References Cited

U.S. PATENT DOCUMENTS

| | | | | | |
|---|---|---|---|---|---|
| 5,442,553 A | | 8/1995 | Parrillo | | 364/424.04 |
| 5,555,498 A | * | 9/1996 | Berra et al. | | 701/33 |
| 5,646,865 A | * | 7/1997 | Alfaro et al. | | 701/29 |
| 5,737,711 A | * | 4/1998 | Abe | | 701/29 |
| 5,790,965 A | * | 8/1998 | Abe | | 701/29 |
| 5,815,071 A | | 9/1998 | Doyle | | 340/439 |
| 5,848,064 A | | 12/1998 | Cowan | | 370/338 |
| 5,884,202 A | | 3/1999 | Arjomand | | 701/29 |
| 5,922,037 A | | 7/1999 | Potts | | 701/29 |
| 6,006,147 A | * | 12/1999 | Hall et al. | | 701/29 |
| 6,181,992 B1 | * | 1/2001 | Gurne et al. | | 701/29 |

* cited by examiner

*Primary Examiner*—John Tweel
(74) *Attorney, Agent, or Firm*—Baker & Hostetler LLP

(57) ABSTRACT

A wireless communication module communicates with a remote station and a plurality of motor vehicle control units that implement at least two different communication protocols within a single motor vehicle. The wireless communication module includes an RF interface, a processor and a selectable multiple protocol interface. The processor communicates with the RF interface and thereby communicates with the remote station. The processor executes diagnostic routines and thereby provides commands to one of the plurality of motor vehicle control units. The selectable multiple protocol interface is coupled between the plurality of motor vehicle control units and the processor. The selectable multiple protocol interface converts processor commands into a format that is readable by the selected motor vehicle control unit and converts received diagnostic information into a format that is readable by the processor. If desired, both the selectable multiple protocol interface and the processor functionality can be incorporated within the field programmable gate array (FPGA).

44 Claims, 7 Drawing Sheets

MULTI-PROTOCOL WIRELESS COMMUNICATION MODULE

FIELD OF THE INVENTION

The present invention is generally related to a diagnostic tool. More particularly, the present invention relates to a wireless communication module for communicating with a motor vehicle that includes multiple control units that implement at least two different communication protocols.

BACKGROUND OF THE INVENTION

Today, motor vehicles include electronic control units for controlling various systems and/or subsystems within the vehicle. Such control units, for example, are employed to control the engine, transmission, brakes and the steering mechanism. These control units are typically coupled to a variety of sensors and/or actuators. Depending on the vehicle, the control units may implement various different communication protocols. In addition, many of these control units operate at different voltage levels and may transmit data and signal information in differential or single-ended modes.

Many prior art diagnostic tools have been coupled to a vehicle diagnostic connector with cables. These cables have constrained a user of such tools. In an effort to make diagnostic tools less cumbersome to use, at least one prior art diagnostic system has included a main control module and a user interface module. The main control module connected to the vehicle diagnostic connector and executed translation routines directed at a control unit within the vehicle. This main control module wirelessly communicated with the user interface module, thus obviating the need for cables to connect the modules. As mentioned above, diagnostic systems of this type have been implemented because it was desirable for a diagnostic technician to be able to diagnose a motor vehicle unconstrained by cables. However, this diagnostic system only implemented a single communication protocol.

Other diagnostic tools have included multiple hard-wired communication circuits that allowed the diagnostic tool to interpret multiple protocols from different control units. A different diagnostic tool included a field programmable gate array (FPGA). The FPGA allowed a diagnostic technician to download different images into the FPGA, such that the FPGA could accommodate different communication protocols. In this case, the FPGA served as a communication interface between one of the motor vehicle control units and a microcontroller, located in the diagnostic tool. However, diagnostic tools including FPGAs of this nature have only provided one communication protocol interface at a time. That is, these FPGAs have required reprogramming, such as when a new image was loaded into the FPGA, in order to communicate with a control unit that used a different communication protocol. However, many motor vehicles include multiple control units that implement different communication protocols within the same motor vehicle.

Thus, there is a need for a wireless diagnostic module that is capable of remotely communicating with various control units that implement different communication protocols.

SUMMARY OF THE INVENTION

The foregoing need has been satisfied, to a great extent, by the present invention which is directed to a wireless communication module for communicating with a remote station and a plurality of motor vehicle control units that implement at least two different communication protocols. In accordance with one embodiment of the invention, the wireless communication module includes an RF interface, a processor and a selectable multiple protocol interface. The processor communicates with the RF interface and thereby communicates with the remote station. The processor executes translation routines and thereby provides requests to one of the plurality of motor vehicle control units. The selectable multiple protocol interface is coupled between the plurality of motor vehicle control units and the processor. The selectable multiple protocol interface converts processor requests into motor vehicle control unit readable formats and converts received diagnostic information into a processor readable format.

In another embodiment, the selectable multiple protocol interface is implemented within a field programmable gate array (FPGA). In yet another embodiment, the processor is incorporated within the FPGA, obviating the need for a separate processor.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENTS OF THE INVENTION

Figure 2A:
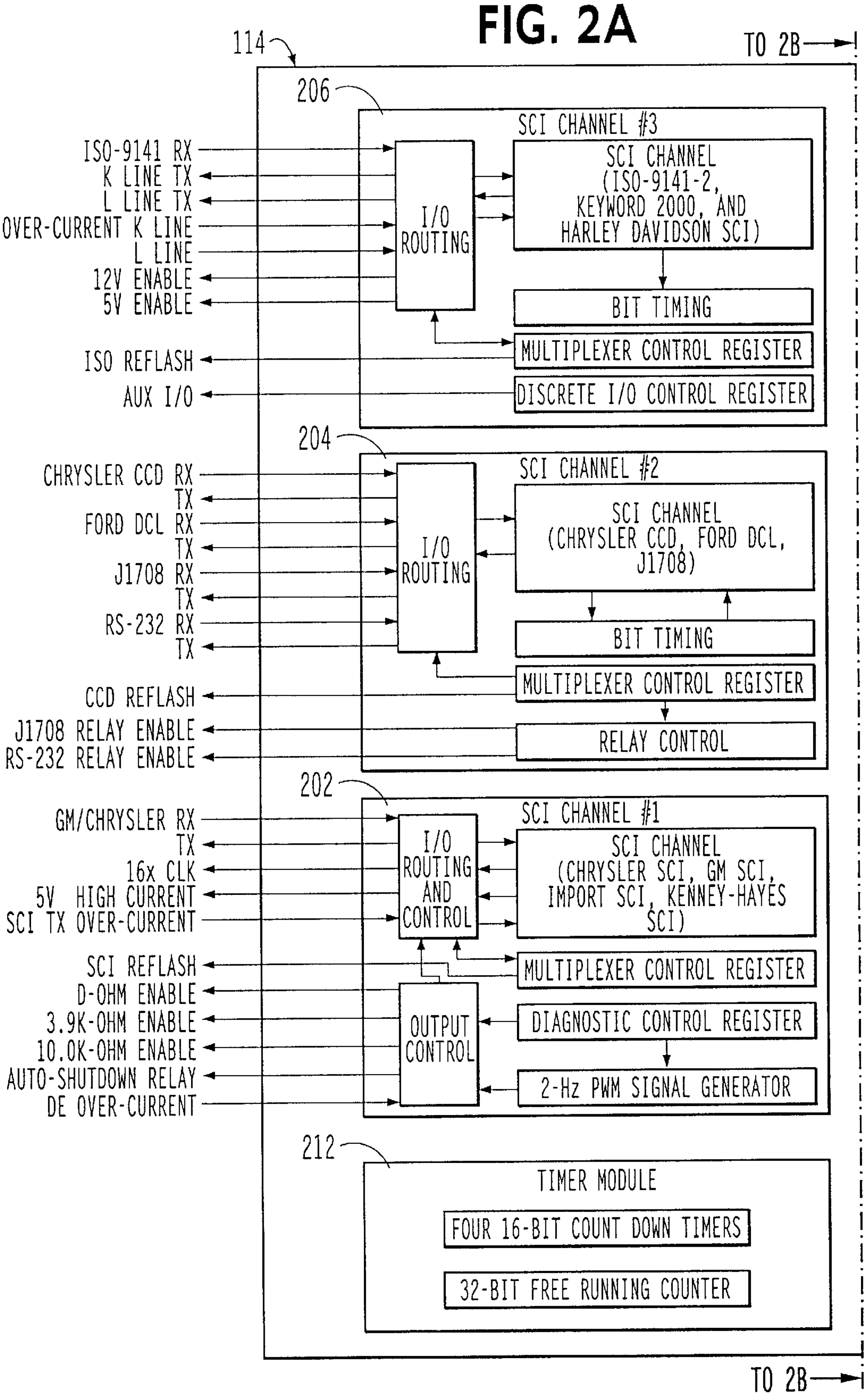
FIG. 2 is a block diagram of a logic device implementing various communication protocol modules, according to one embodiment of the present invention.
Figure 2B:
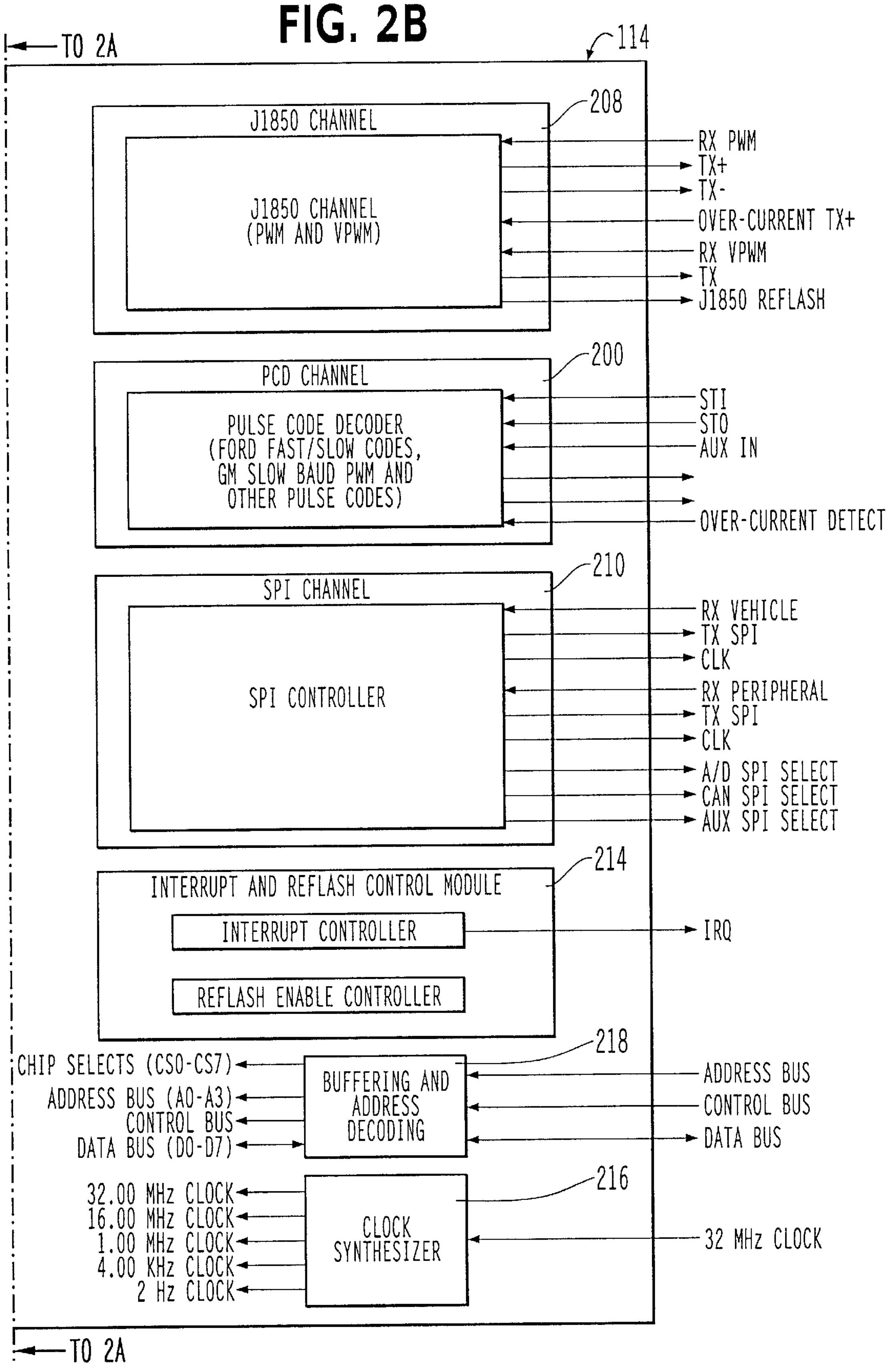

A wireless communication module, embodying the present invention, couples to an existing vehicle diagnostic connector and provides a multi-protocol communication interface. The multi-protocol communication interface provides interface logic for on-board diagnostics (OBD) I, OBD II and enhanced OBD II vehicles. An embodiment of the present invention includes a logic device that has eight modules, as is shown in FIG. 2. The disclosed modules are configured such that they can selectively implement multiple communication protocols. For example, a J1850 channel module handles either a pulse width modulation (PWM) or a variable pulse width modulation (VPWM) communication protocol. Grouping similar communication protocols within a single module allows conversion circuitry that is common to the grouped communication protocols to be shared.

Figure 1A:
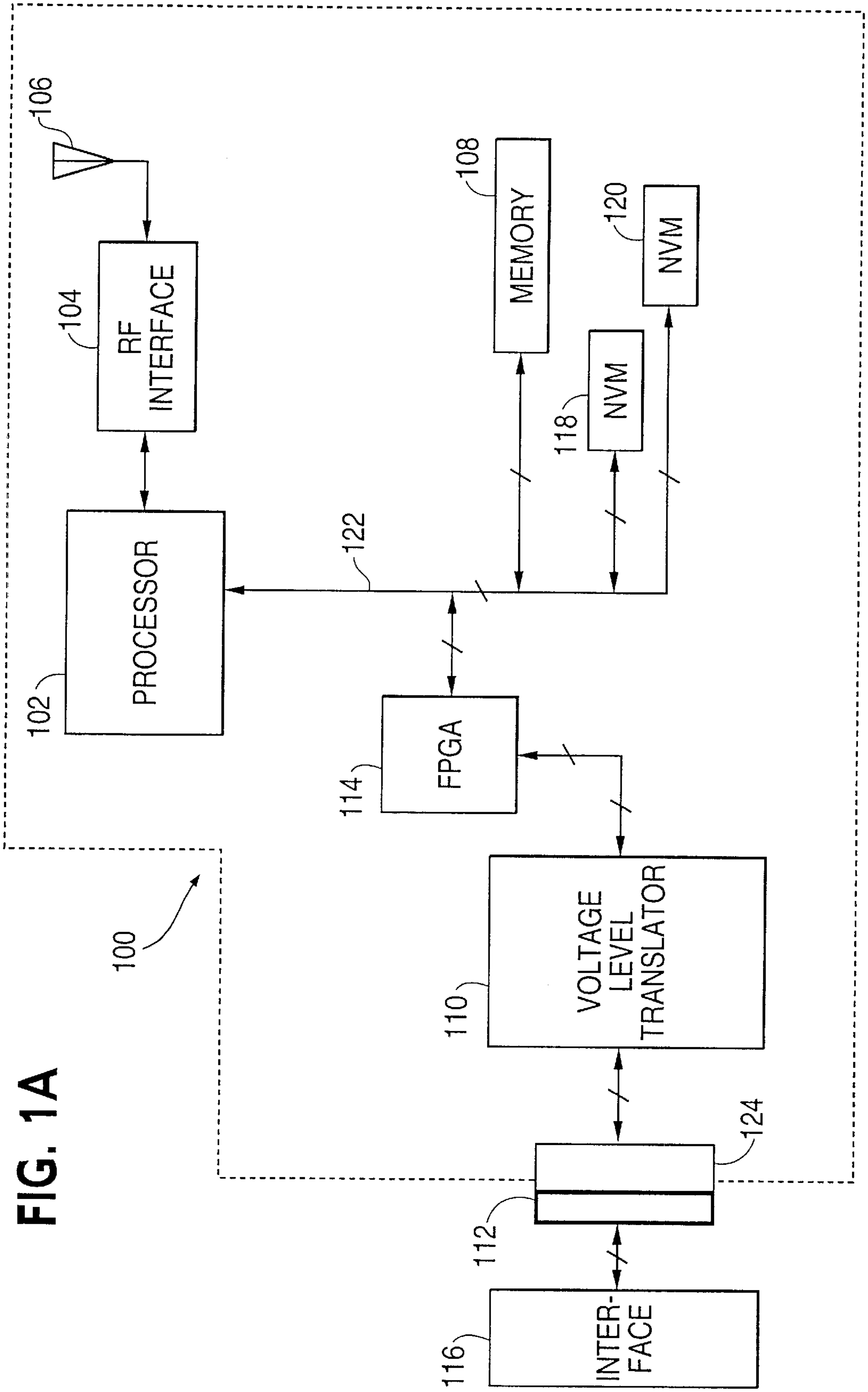
FIG. 1A is a block diagram of a wireless communication module in accordance with a preferred embodiment of the present invention.

Referring now to the figures, in FIG. 1A there is shown a block diagram of a wireless communication module 100, according to an embodiment of the present invention. Wireless communication module 100 includes a voltage level translator 110 that is coupled to a motor vehicle communication interface 116 through an existing vehicle diagnostic connector 112 (typically located in the vehicle passenger compartment). Voltage level translator 110 changes the level of signals received from a motor vehicle control unit to voltage levels compatible with a processor 102, such as a microprocessor. For example, the J1850 VPWM standard requires a high level signal to be between 4.25 and 20 volts and a low level signal to be between ground and 3.5 volts. In a typical 3.3 volt implementation, processor 102 would require a high level signal to be between 2.64 and 3.3 volts and a low level signal to be between ground and 0.66 volts. Thus, translator 110 converts a received signal to a voltage level appropriate for processor 102.

In a similar manner, voltage level translator 110 translates a signal that is being transmitted from wireless communication module 100 to a motor vehicle control unit, to an appropriate voltage level. In addition to translating J1850 signals, voltage level translator 110 can translate signals for ISO 9141, Chrysler collision detection (CCD), data communication links (DCL), serial communication interface (SCI), S/F codes, a solenoid drive, J1708, RS232, controller area network (CAN), a 5 volt I/O, a diagnostic enable and an analog-to-digital (A/D) converter.

Circuitry for translating a signal from one voltage level to another is well known to those of ordinary skill in the art. In the preferred embodiment, translator 110 includes circuitry to translate all signal voltage levels currently implemented within a motor vehicle. As such, the circuitry to translate a particular communication protocol's voltage level is selected by a programmable logic part like a field programmable gate array (FPGA) 114 (e.g., by tri-stating unused transceivers or by providing a keying device that plugs into a connector 124 that is provided by wireless communication module 100). Connector 124 of the wireless communication module 100 plugs into connector 112 of the vehicle and thereby couples wireless communication module 100 to vehicle communication interface 116.

The FPGA 114 transmits to and receives signals from a motor vehicle control unit through translator 110. FPGA 114 provides an appropriate signal to translator 110 so that a received or transmitted signal is translated, as previously discussed above, according to the communication protocol implemented by the motor vehicle control unit. FPGA 114 is also coupled to processor 102 in a conventional manner through various address, data and control lines, by the system bus 122. If desired, the processor itself can be emulated within FPGA 114. As is discussed in more detail below, FPGA 114 provides a multiple communication protocol interface between processor 102 and a motor vehicle control unit. In a preferred embodiment, FPGA 114 is a 10K50E manufactured by the Altera Corporation, and processor 102 is a MPC823 manufactured by the Motorola Corporation.

The multiple communication protocol interface converts data from a communication protocol implemented by a motor vehicle control unit into a processor readable format. In this manner, processor 102 can read error codes from a motor vehicle control unit and provide test signals to a motor vehicle control unit such that various actuators and/or sensors within a motor vehicle can be tested.

Processor 102 is also coupled to an RF interface 104. RF interface 104 is coupled to an antenna 106. RF interface 104 includes an RF transceiver operating in a frequency range from about 800 MHZ to about 2.5 GHZ. Interface 104 also includes a modem for radio packet communication. Processor 102 is programmed to provide modulated RF output signals of vehicle data to a remote diagnostic technician. Based upon requests received from an RF remote station, processor 102 runs selected communication routines to communicate with selected motor vehicle control units.

A memory subsystem 108, an internal non-volatile memory 118 and an external non-volatile memory 120 are also coupled to system bus 122. Memory subsystem 108 includes an application dependent amount of dynamic random access memory (DRAM) and read only memory (ROM). Internal non-volatile memory 118 and external non-volatile memory 120 can be an EEPROM or flash ROM. Internal non-volatile memory 118 can provide storage for boot code, self-diagnostics, various drivers and space for FPGA images, if desired. External non-volatile memory 120 can provide for storage of updated programs or data (e.g., diagnostic trouble codes (DTCs)). If less than all of the modules are implemented in FPGA 114, memory 118 and/or memory 120 can contain downloadable images so that FPGA 114 can be reconfigured for a different group of communication protocols.

Figure 1B:
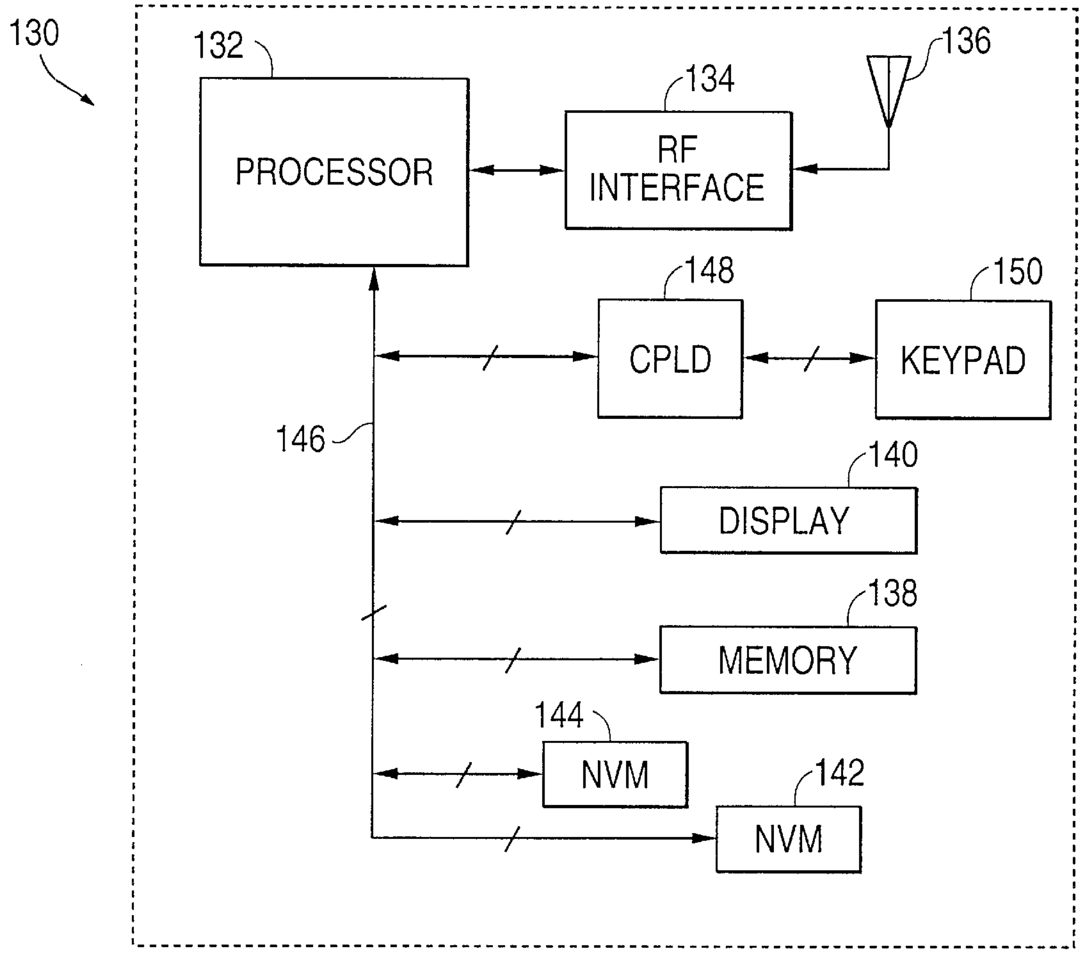
FIG. 1B is a block diagram of a remote station for communicating with the wireless communication module of FIG. 1A.

FIG. 1B is a block diagram of a remote station 130, according to an embodiment of the present invention. Remote station 130 can be, for example, a handheld device or a personal computer. Remote station 130 includes a processor 132 that is coupled to a display 140 and a complex programmable logic device (CPLD) 148, through a system bus 146. Processor 132 is programmed to provide output to a diagnostic technician through display 140 and receive input from the diagnostic technician through a keypad 150. Processor 132 runs selected communication routines to communicate with wireless communication module 100 and thereby communicate with selected motor vehicle control units. CPLD 148 is also coupled to keypad 150. CPLD 148 provides logic for decoding various inputs from the user of remote station 130 (through keypad 150) and also provides glue-logic for various other interfacing tasks.

Remote station 130 also includes a memory subsystem 138, an internal non-volatile memory 142 and an external non-volatile memory 144 all coupled to system bus 146. Memory subsystem 138 includes an application dependent amount of dynamic random access memory (DRAM) and read only memory (ROM). Internal non-volatile memory 142 and external non-volatile memory 144 can be an EEPROM or flash ROM. Internal non-volatile memory 142 can provide storage for boot code and various drivers, if desired. External non-volatile memory 144 can provide for storage of updated programs or data. As previously stated, station 130 communicates with wireless communication module 100. If desired, station 130 can communicate with multiple communication modules through various multiplexing (e.g., time division multiplexing (TDM)) or addressing techniques. One of skill in the art will readily appreciate that, in order to communicate, a remote station must implement the same RF modulation techniques in the same frequency ranges as a given wireless communication module. The power requirements of a given wireless diagnostic system is a function of a given RF transceivers sensitivity and the geographical range desired.

Figure 1C:
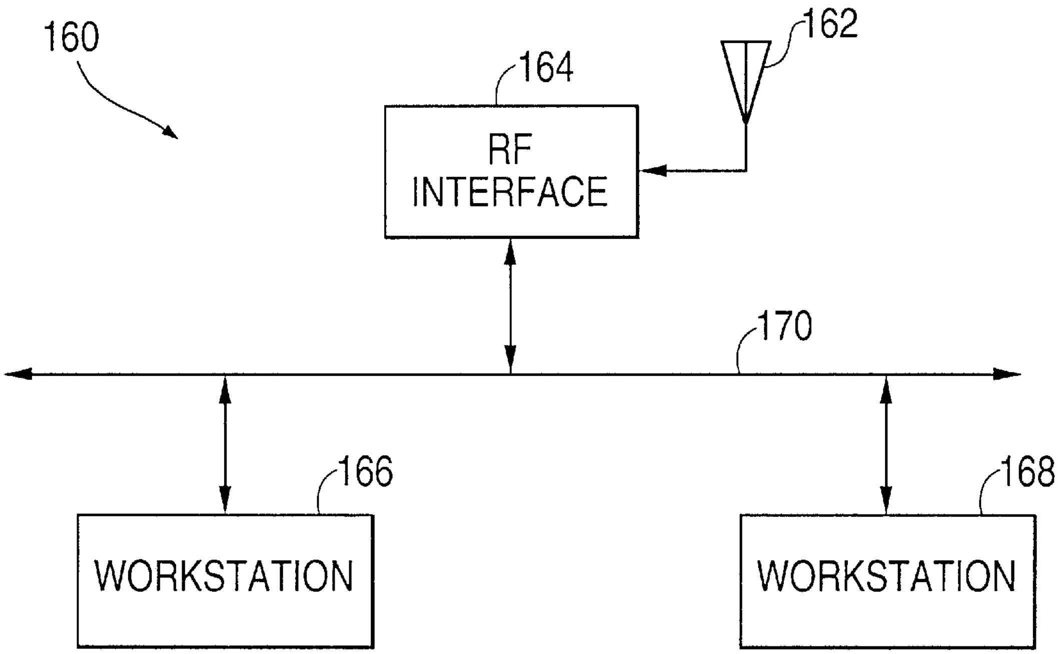
FIG. 1C is a block diagram of another remote station for communicating with the wireless communication module of FIG. 1A.

FIG. 1C is a block diagram of another remote station 160. Remote station 160 includes a workstation 166 and a workstation 168 coupled to a local area network (LAN) 170, through network interface cards (NICs) (not shown). LAN 170 can include a copper or fiber optic media and can be of various commercially available varieties (e.g., Ethernet). An RF interface 164 is coupled to an antenna 162 and LAN 170. RF interface 164 includes circuitry that performs the functions of a transceiver, a modem and a network interface card (NIC). RF interface 164 can, for example, act as a cellular telephone and a modem (i.e., broadcast in the 800 to 900 MHz range). One of skill in the art will appreciate that RF interface 164 could readily be replaced with an infrared or other appropriate interface. Although not shown, RF interface 164 preferably includes a processor and an application appropriate amount of memory. This processor controls and carries out various operations (e.g., controls transmission of data onto and from LAN 170) as is well understood by those of ordinary skill in the art. Utilizing either workstations 166 or 168, a technician can communicate with wireless communication module 100.

With remote station 160, a technician can initiate a diagnostic or translation routine in a motor vehicle through workstations 166 or 168. Workstations 166 or 168 packetizes a technician-initiated command or request and transfers the packetized command across LAN 170 to RF interface 164. RF interface 164 receives and modulates the packetized command (according to the selected RF technique), before transmitting the modulated command through antenna 162. The modulated command is received by antenna 106 of wireless communication module 100 of FIG. 1A. At that point, RF interface 104 demodulates the modulated command and provides the command to processor 102. In response to the command, processor 102 performs a command specific routine. As is further discussed below, the command specific routine causes a protocol specific signal (or signals) to be sent to one of the motor vehicle control units.

An advantage of remote station 160 is that multiple diagnostic technicians can utilize workstations 166 and 168 and thereby communicate with multiple wireless communication modules 100 in different vehicles. In addition, remote station 160 can provide for shared storage resources which allows access to data on various vehicles. In this manner, the technician can track various faults that are common to a particular make and/or model. Additionally, the technician may address multiple communication modules 100 through a single workstation 166 or 168.

FIG. 2 further depicts a programmable logic part like an FPGA 114, which includes eight modules, according to an embodiment of the present invention. A first module, a pulse code decoder (PCD) channel module 200, includes a PCD for GM slow baud pulse width modulation (PWM), Ford fast and slow pulse codes and for Import pulse code protocols. A second module 202, is serial communication interface (SCI) channel #1 for generic GM, Chrysler and Import SCI vehicle communications. A third module 204, is SCI channel #2 for Chrysler collision detection (CCD), Ford data communications link (DCL), heavy duty J1708 and RS232 vehicle communications.

A fourth module 206, is SCI channel #3 for ISO 9141, Ford 9141, Keyword 2000, and Harley-Davidson SCI vehicle communication. A fifth module 208 provides a J1850 channel for pulse width modulation (PWM) and variable pulse width modulation (VPWM) vehicle communication. A sixth module 210, is a serial peripheral interface (SPI) channel module to communicate with an analog-to-digital (A/D) converter, a controller area network (CAN) interface and Import SPI vehicles.

A seventh module 212 provides multiple timers for the timing of various vehicle communications. An eighth module 214, is an interrupt and reflash control module, which provides for enabling and disabling the interface's global interrupt and provides the capability of performing reflash operations on a memory within a motor vehicle. In addition, FPGA 114 includes a clock synthesizer 216, as well as, various buffers and logic for address decoding 218.

Implementing multiple modules within one logic device, such as FPGA 114, provides a comprehensive interface that can accommodate multiple communication protocols found in many motor vehicles. As disclosed herein, each module has a corresponding block of sixteen 8-bit address locations. These address locations (registers) allow a user to program a module for a desired communication protocol.

While the preferred embodiment includes eight modules, the discussion herein is limited to the fifth module 208. All other communication protocol modules are implemented in a similar fashion, as will be readily apparent to those of ordinary skill in the art. As configured, module 208 handles J1850 communication for the VPWM (GM and Chrysler) and PWM (Ford) protocols.

Figure 3:
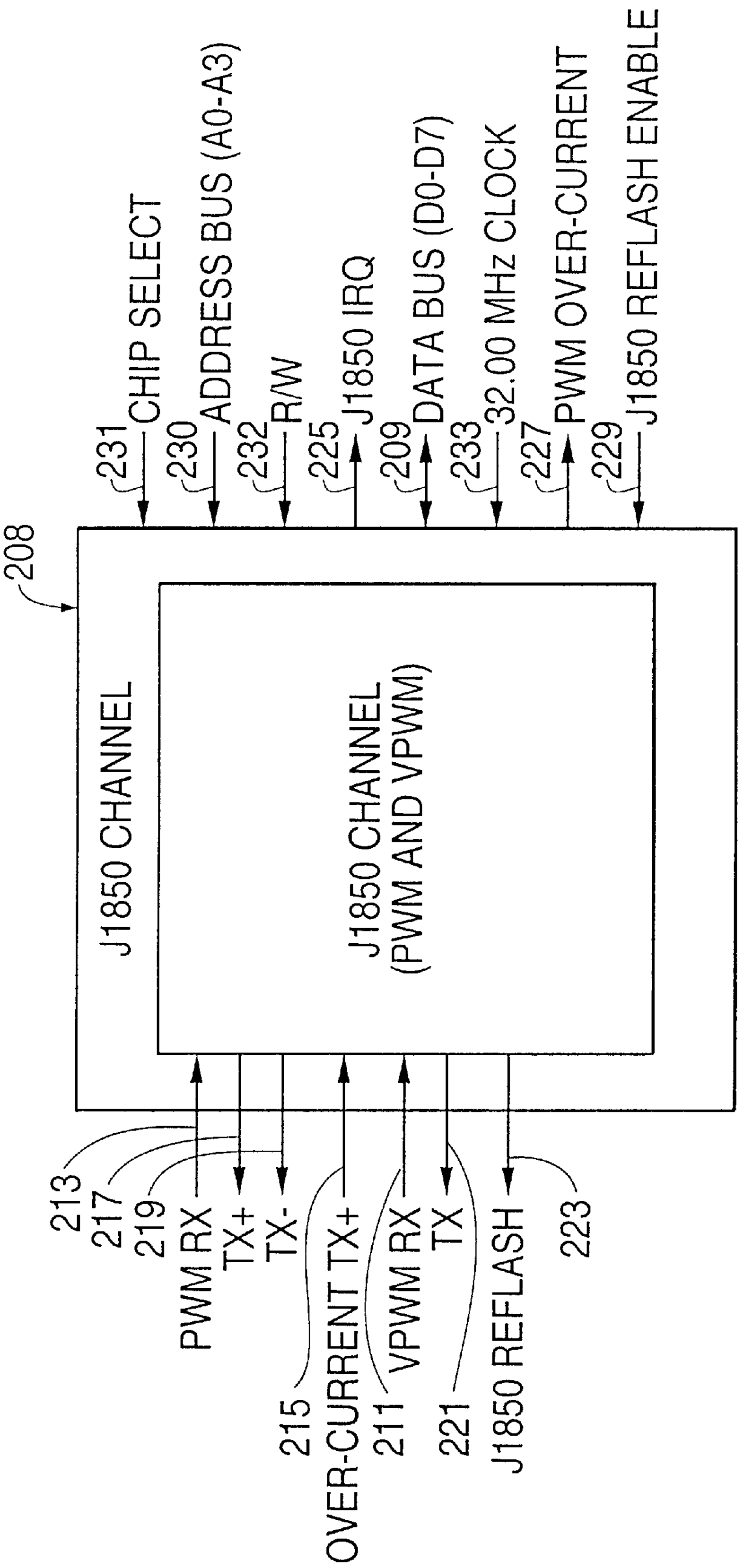
FIG. 3 is a block diagram of a J1850 communication protocol module, in accordance with one embodiment of the present invention.

FIG. 3 is a block diagram of the J1850 communication protocol channel module. Information is provided to J1850 channel module 208 across a data bus 209 (D0-D7), a VPWM receive line 211 (VPWM RX), a PWM receive line 213 (PWM RX) and an over-current transmit (TX+) line 215. The J1850 channel module 208 transmits data to a motor vehicle control unit across differential transmission lines 217 and 219 (PWM TX+ and PWM TX−, respectively) when programmed for PWM mode. When programmed for a VPWM mode, J1850 channel module 208 transfers information over a VPWM transmission line 221 (VPWM TX).

J1850 channel module 208 also provides a J1850 reflash signal on line 223, a J1850 interrupt request (IRQ) signal on line 225 and a PWM over-current signal on line 227. J1850 channel module 208 also receives a J1850 reflash enable signal on line 229. When addressed over an address bus 230 (A0–A3) and enabled by the chip select line 231, J1850 channel module 208 either provides or receives information across the data lines 209 (D0–D7). This is determined by the state of a read/write (R/W) line 232. A clock input line 233 supplies 32 MHz clock pulses to module 208.

Figure 4:
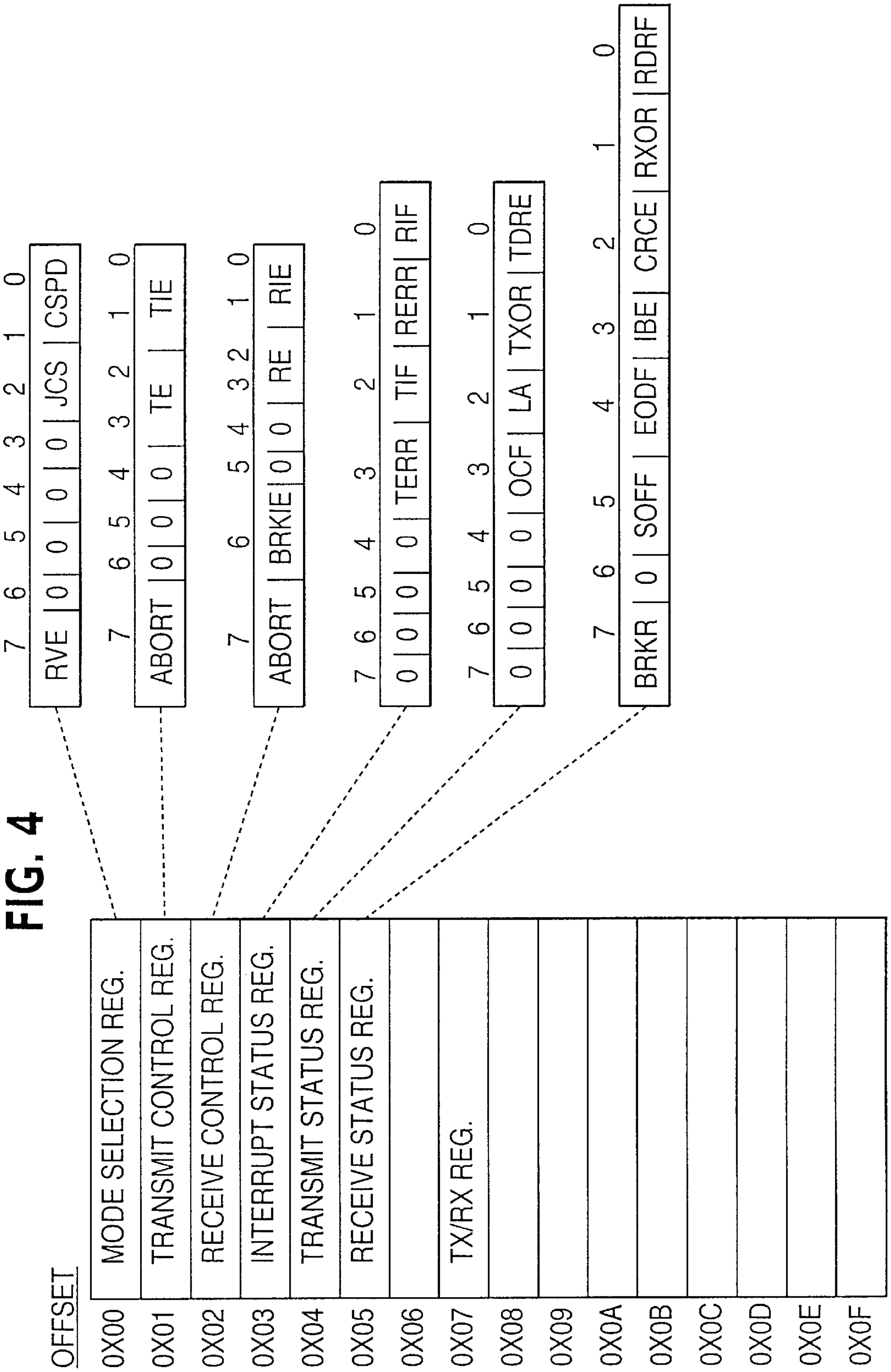
FIG. 4 is a diagram of the control and status registers for the J1850 communication protocol module of FIG. 3.

FIG. 4 is the address map showing the control and status registers of the J1850 channel module 208. A mode selection register is located at address offset 0X00. A transmit control register is located at address offset 0X01. A receive control register is located at address offset 0X02. An interrupt status register is located at address offset 0X03. A transmit status register is located at address offset 0X04. A receive status register is located at address offset 0X05. A transmit/receive (TX/RX) register is located at address offset 0X07. Each of these registers, which in the disclosed embodiment are 8-bit registers, are further described below.

The mode selection register controls the operational mode of the J1850 channel module. When bit 7 (RVE) of the mode selection register is high, the reflash voltage is enabled. When bit 7 of the mode selection register is low, the reflash voltage is disabled. If bit 2 (JCS) of the mode selection register is high, the VPWM protocol is selected. If bit 2 of the mode selection register is low, the PWM protocol is selected. Bits 0 and 1 (CSPD) of the mode selection register determine the communication speed. If both bits 0 and 1 of the mode selection register are high, the speed is set to a multiple of four. If bit 1 of the mode selection register is high, the speed is set to a multiple of two. If bit 0 of the mode selection register is high, the speed is set to a multiple of one. For PWM, this corresponds to a baud rate of 41.6 k. For VPWM, this corresponds to a baud rate of 10.4 k. When both bits 1 and 0 of the mode selection register are low, communication is disabled. Writing to the mode selection register performs an internal reset operation. That is, all of the registers are reset to their power-on reset state.

The transmit control register controls transmit operations. When bit 7 (ABORT) of the transmit control register is high, all transmit operations are aborted. Setting bit 6 (BRKIE) of the transmit control register high causes a brake character to be sent. Any transmit or receive operation that is currently in progress will complete before the brake character is sent. Bit 6 of the transmit control register is reset low only after the brake character has been transmitted or an abort control bit has been set high.

Bits 2 and 3 (TE) of the transmit control register determine how a transmit operation is performed. If both bits 2 and 3 are low, no transmit operation is in progress. When bit 2 is high, a normal transmit operation is to be performed. When bit 3 is high, an in-frame response (IFR) is sent without a CRC (cyclic redundancy check) bit. The IFR provides a platform for remote receiving nodes to actively acknowledge a transmission. The remote receiving node appends a reply to the end of the transmitting nodes original message frame. The IFRs allow for increased efficiency in transmitting messages since the receiving node may respond within the same message frame that the request originated.

When both bits 2 and 3 are high, an in-frame response is sent with a CRC bit. Bits 2 and 3 are only reset after the transmit operation is complete, the abort control bit is set high or if arbitration is lost during data transmission. Bits 0 and 1 (TIE) of the transmit control register dictate whether an interrupt is generated. If bits 0 and 1 are low, no interrupt is generated. If bit 0 is high, an interrupt is generated when the transmit FIFO buffer is not full. If bit 1 is high, an interrupt is generated when the transmit FIFO buffer contains fewer than eight bytes. If bits 0 and 1 are high, an interrupt is generated when an EOD (end-of-data) character is transmitted.

The receive control register dictates how receive operations are handled. Setting bit 7 (ABORT) of the receive control register high aborts all receive operations. Bit 6 (BRKIE) of the receive control register dictates how an interrupt is handled. If bit 6 is high, an interrupt is generated when a brake character is received. If bit 6 is low, no interrupt is generated when a brake character is received. Bits 2 and 3 (RE) of the receive control register determine how or whether a receive operation is enabled. If bits 2 and 3 are low, no receive operation is in progress. If bit 2 is high, a normal receive operation is to be performed. If bit 3 is high, an in-frame response is received without a CRC bit. If both bits 2 and 3 are high, an in-frame response is received with a CRC bit. Bits 0 and 1 (RIE) dictate how a receive interrupt is handled. If bits 0 and 1 are high, an interrupt is generated when a EOD character is received. If bit 1 is high and bit 0 is low, an interrupt is generated when the receive FIFO buffer contains four or more bytes. When bit 0 is high, an interrupt is generated when the receive FIFO buffer is not empty. If bits 0 and 1 are low, no interrupt is generated.

In the disclosed embodiment, there are three 8-bit read-only registers, which report the status of the J1850 channel. The first register reports the interrupt status of the J1850 channel. The second and third registers report the status of any transmit and receive operations, respectively.

The interrupt status register provides various status information. If bit 3 (TERR) of the interrupt status register is high, a transmit error has occurred. If bit 2 (TIF) of the interrupt status register is high, a transmit interrupt has been generated. If bit 1 (RERR) of the interrupt status register is high, a receive error has occurred. If bit 0 (RIF) of the interrupt status register is high, a receive interrupt has been generated.

The transmit status register also provides various status information. If bit 3 (OCF) of the transmit status register is high, the external vehicle interface circuitry has detected an over-current condition. In response to the over-current condition, the JCS field (bit 2) of the mode selection register is set low (to disable the appropriate transmitting output). If bit 2 (LA) of the transmit status register is high, arbitration was lost during transmission. If bit 1 (TXOR) of the transmit status register is high, a byte was written to the transmit buffer while it was full. If bit 0 (TDRE) of the transmit status register is high, the transmit buffer is empty.

The receive status register also provides various information. If bit 7 (BRKR) of the receive status register is high, a break character was detected. If bit 5 (SOFF) of the receive status register is high, the byte currently stored in the receive buffer was the first byte after the start-of-frame (SOF) bit character. If bit 4 (EODF) of the receive status register is high, the previously stored byte was the last byte of the message. If bit 3 (IBE) of the receive status register is high, an invalid bit was detected during reception. If bit 2 (CRCE) of the receive status register is high, an invalid CRC was detected during operation. If bit 1 (RXOR) of the receive status register is high, an overrun occurred in the receive buffer. If bit 0 (RDRF) of the receive status register is high, the receive buffer is not empty.

The transmit/receive (TX/RX) register is used for transmitting and receiving 8-bit characters. The transmit/receive data register is formed from a 8-bit by 32 byte FIFO. A 2-bit wide by 32-bit deep FIFO is used to hold SOF and EOD status information. Thus, register allocation for J1850 channel module 208, according to an embodiment of the present invention, has been described. One skilled in the art will readily appreciate that various other information could be provided and/or other control bits could be implemented within the logic module.

The J1850 channel module 208 has been configured such that it can selectively implement multiple communication protocols. Specifically, the J1850 channel module can handle either PWM or VPWM communication protocols. Similar communication protocols are typically grouped within the other modules of FPGA 114 such that conversion circuitry common to the grouped communication protocols can be shared. Utilizing multiple modules such as modules 200, 202, 204, 206, 208, 210, 212, 214, 216 and 218 all contained in the FPGA 114, allows the user to advantageously diagnose vehicles that implement multiple communication protocols within the same vehicle.

The above description and drawings are only illustrative of preferred embodiments that achieve the objects, features and advantages of the present invention, and it is not intended that the present invention be limited thereto. Any modification of the present invention that comes within the spirit and scope of the following claims is considered to be part of the present invention.

What is claimed is:

1. A wireless communication module for communicating with a remote station and a plurality of motor vehicle control units within a single motor vehicle, the plurality of motor vehicle control units implementing at least two different communication protocols, the wireless communication module comprising:

an RF interface including an RF transceiver for communicating with the remote station;

a processor for communicating with the RF interface, the processor further executing a plurality of diagnostic routines and thereby providing commands to one of the plurality of motor vehicle control units in response to an input received from the RF interface, wherein each of the plurality of diagnostic routines corresponds to a selected motor vehicle control unit; and a selectable multiple protocol interface coupled between the plurality of motor vehicle control units and the processor, the selectable multiple protocol interface converting the commands from the processor into a format readable by the selected motor vehicle control unit and converting received diagnostic information into a format readable by the processor, wherein the selectable multiple protocol interface is implemented solely within a field programmable gate array (FPGA).

2. The wireless communication module of claim 1, wherein the processor is integrated within the FPGA.

3. The wireless communication module of claim 1, wherein the selectable multiple protocol interface is a J1850 channel module that includes conversion circuitry for J1850 variable pulse width modulation (VPWM) and J1850 pulse width moudlation (PWM) communication protocols.

4. The wireless communication module of claim 1, wherein the selectable multiple protocol interface is a pulse code decorder (PCD) channel module that includes conversion circuitry for GM slow baud pulse width modulation (PWM), Ford fast and slow pulse codes and Import pulse code communication protocols.

5. The wireless communication module of claim 1, wherein the selectable multiple protocol interface is a serial communication interface (SCI) channel module that includes conversion circuitry for generic GM, Chrysler and Import SCI communication protocols.

6. The wireless communication module of claim 1, wherein the selectable multiple protocol interface includes conversion circuitry for Chrysler collision detection (CCD), Ford data communication links (DCL), heavy duty J1708 and RS232 communication protocols.

7. The wireless communication module of claim 1, wherein the selectable multiple protocol interface is a serial communication interface (SCI) channel module that includes conversion circuitry for ISO 9141, Ford 9141, Keyword 2000 and Harley-Davidson SCI communication protocols.

8. The wireless communication module of claim 1, wherein the selectable multiple protocol interface includes a serial communication interface (SCI) channel module that includes conversion circuitry for an analog-to-digital converter, a controller area network (CAN) and an Import serial peripheral interface (SPI) communication protocol.

9. The wireless communication module of claim 1, wherein the RF transceiver operates in a frequency range from about 800 MHZ to about 2.5 GHZ.

10. The wireless communication module of claim 1, wherein the RF interface further includes a modem for radio packet communication.

11. The wireless communication module of claim 1, wherein the RF transceiver operates in a frequency range from about 800 MHZ to about 2.5 GHZ and the RF interface further includes a modem for radio packet communication.

12. The wireless communication module of claim 9, 10 or 11, further comprising:

a selectable signal translator coupled between the plurality of motor vehicle control units and the selectable multiple protocol interface, the selectable signal translator changing a voltage level of the commands from the processor or the diagnostic information from the selected motor vehicle control unit to a voltage level compatible with the selected motor vehicle control unit or the processor, respectively.

13. The wireless communication module of claim 1, 9, 10 or 11, further comprising:

a non-volatile memory coupled to the processor, the non-volatile memory storing the diagnostic routines for the selected motor vehicle control unit which responds to receive the commands from the processor and to transmit the diagnostic information to the processor in response to the commands.

14. The wireless communication module of claim 13, wherein the non-volatile memory is a flash ROM.

15. The wireless communication module of claim 13, wherein the non-volatile memory is an EEPROM.

16. The wireless communication module of claim 13, wherein the non-volatile memory is provided external to the wireless communication module as a plug-in module.

17. A wireless diagnostic system for communicating with a plurality of motor vehicle control units within a single motor vehicle, the plurality of motor vehicle control units implementing at least two different communication protocols, the wireless diagnostic system comprising:

a wireless communication module, including:

a first RF interface including an RF transceiver providing for communication;

a processor for communicating with the first RF interface, the processor further executing a plurality of diagnostic routines and thereby providing commands to one of the plurality of motor vehicle control units in response to an input received from the first RF interface, wherein each of the plurality of diagnostic routines corresponds to a selected motor vehicle control unit; and a selectable multiple protocol interface coupled between the plurality of motor vehicle control units and the processor, the selectable multiple protocol interface converting the commands from the processor into a format readable by the selected motor vehicle control unit and converting received diagnostic information into a format readable by the processor, wherein the selectable multiple protocol interface is implemented solely within a field programmable gate array (FPGA); and a remote station for communicating with the first RF interface and providing a user interface.

18. The wireless diagnostic system of claim 17, further comprising:

a selectable signal translator coupled between the plurality of motor vehicle control units and the selectable multiple protocol interface, the selectable signal translator changing a voltage level of the requests from the processor or the diagnostic information from the selected motor vehicle control unit to a voltage level compatible with the selected motor vehicle control unit or the processor, respectively.

19. The wireless diagnostic system of claim 17, further comprising:

a non-volatile memory coupled to the processor, the non-volatile memory storing the translation routines for the selected motor vehicle control unit which responds to receive the requests from the processor and to transmit the diagnostic information to the processor in response to the requests.

20. The wireless diagnostic system of claim 19, wherein the non-volatile memory is a flash ROM.

21. The wireless diagnostic system of claim 19, wherein the non-volatile memory is an EEPROM.

22. The wireless diagnostic system of claim 19, wherein the non-volatile memory is provided external to the wireless communication module as a plug-in module.

23. The wireless diagnostic system of claim 17, wherein the processor is integrated within the FPGA.

24. The wireless diagnostic systems of claim 17, wherein the selectable multiple protocol interface is a J1850 channel module that includes conversion circuitry for J1850 variable pulse width modulation (VPWM) and J1850 pulse width modulation (PWM) communication protocols.

25. The wireless diagnostic system of claim 17, wherein the selectable multiple protocol interface is a pulse code decorder (PCD) channel module that includes conversion circuitry for GM slow baud pulse width modulation (PWM), Ford fast and slow pulse codes and Import pulse code communication protocols.

26. The wireless diagnostic system of claim 17, wherein the selectable multiple protocol interface is a serial communication interface (SCI) channel module that includes conversion circuitry for generic GM, Chrysler and Import SCI communication protocols.

27. The wireless disagnostic system of claim 17, wherein the selectable multiple protocol interface includes conversion circuitry for Chrysler collisi8on detection (CCD), Ford data communication links (DCL), heavy duty J1708 and RS232 communication protocols.

28. The wireless diagnostic system of claim 17, wherein the selectable multiple protocol interface is a serial communication interface(SCI) channel module that includes conversion circuitry for ISO 9141, Ford 9141, Keyword 2000 and Harely-Davidson SCI communication protocols.

29. The wireless diagnostic system of claim 17, wherein the selectable multiple protocol interface includes a serial communication interface (SCI) channel module that includes conversion circuitry for an analog-to-digital converter, a controller area network (CAN) and an Import serial peripheral interface (SPI) communication protocol.

30. The wireless diagnostic system of claim 17, wherein the remote station further includes:

an antenna;

a second RF interface coupled to the antenna;

a workstation, the workstation receiving an input from a user and displaying an output to the user; and a local area network (LAN) coupling the workstation to the second RF interface.

31. The wireless diagnostic system of claim 17, wherein the remote station further includes:

an antenna;

a second RF interface coupled to the antenna;

a processor coupled to the second RF interface, the processor further receiving an input from a user and displaying an output to the user;

a keypad providing the processor with the input from the user; and a display for displaying the output from the processor to the user.

32. The wireless diagnostic system of claim 17, wherein the RF transceiver operates in a frequency range from about 800 MHZ to about 2.5 GHZ.

33. The wireless diagnostic system of claim 17, wherein the first RF interface further includes a modem for radio packet communication.

34. The wireless diagnostic system of claim 17, wherein the RF transceiver operates in a frequency range from about 800 MHZ to about 2.5 GHZ and the first RF interface further includes a modem for radio packet communication.

35. A method for providing a wireless communication module for communicating with a remote station and a plurality of motor vehicle control units within a single motor vehicle, the plurality of motor vehicle control units implementing at least two different communication protocols, the method comprising the steps of:

providing an RF interface including an RF transceiver for communicating with the remote station;

providing a processor for communicating with the RF interface, the processor further executing a plurality of diagnostic routines and thereby providing commands to one of the plurality of motor vehicle control units in response to an input received from the RF interface, wherein each of the plurality of diagnostic routines corresponds to a selected motor vehicle control unit; and providing a selectable multiple protocol interface coupled between the plurality of motor vehicle control units and the processor, the selectable multiple protocol interface converting the commands from the processor into a format readable by the selected motor vehicle control unit and converting received diagnostic information into a format readable by the processor, wherein the selectable multiple protocol interface is implemented solely within the field programmable gate array (FPGA).

36. The method of claim 35, wherein the RF transceiver operates in a frequency range from about 800 MHZ to about 2.5 GHZ.

37. The method of claim 35, wherein the RF interface further includes a modem for radio packet communication.

38. The method of claims 35, wherein the RF transceiver operates in a frequency range from about 800 MHZ to about 2.5 GHZ and the RF interface further includes a modem for radio packet communication.

39. A wireless communication module for communicating with a remote station and a plurality of motor vehicle control units within a single motor vehicle, the plurality of motor vehicle control units implementing at least two different communication protocols, the wireless communication module comprising:

an RF communications means including an RF transceiver means for interfacing with the remote station;

processing means for communicating with RF communications means, executing a plurality of translation routines, and providing requests to one of the plurality of motor vehicle control units in response to an input received form the RF communications means, wherein each of the plurality of translation routines corresponds to a selected motor vehicle control unit; and selectable multiple protocol interface means coupled between coupled between the plurality of motor vehicle control unites and the processing means, wherein the selectable multiple protocol converting means is for converting the requests from the processing means into a format readable b the selected motor vehicle control unit, and for converting received diagnostic information into a format readable by the processing means, wherein the selectable multiple protocol interface means is implemented solely within a field programmable gate array (FPGA).

40. The wireless communication module of claim 39, wherein the RF transceiver means operates in a frequency range from about 800 MHZ to about 2.5 GHZ.

41. The wireless communication module of claim 39, wherein the RF communications means further includes a modem means for radio packet communication.

42. The wireless communication module of claim 39, wherein the RF transceiver means operates in a frequency range from about 800 MHZ to about 2.5 GHZ and the RF communication means further includes a modem means for radio packet communications.

43. The wireless communication module of claim 39, 40, 41 or 42, further comprising:

selectable voltage level changing means coupled between the plurality of motor vehicle control units and the selectable multiple protocol interface means, wherein the selectable voltage level changing means changes a voltage level of the requests from the processor or the diagnostic information from the selected motor vehicle control unit to a voltage level compatible with the selected motor vehicle control unit or the processor, respectively.

44. The wireless communication of claims, 39, 40, 41 or 42, further comprising:

storage means coupled to the processing means for storing the translation routines for the selected motor vehicle control unit that response to receipt of the requests from the processing means, and for storing the diagnostic information for transmission to the processing means in response to the requests.

* * * * *